United States Patent
Lee

(10) Patent No.: US 8,446,049 B2
(45) Date of Patent: May 21, 2013

(54) ELECTRONIC APPARATUS AND METHOD FOR CONDITIONALLY POWER SUPPLYING

(75) Inventor: Yun-Hsien Lee, Kaohsiung (TW)

(73) Assignee: Getac Technology Corporation, Hsinchu (TW)

(*) Notice: Subject to any disclaimer, the term of this patent is extended or adjusted under 35 U.S.C. 154(b) by 340 days.

(21) Appl. No.: 12/892,776

(22) Filed: Sep. 28, 2010

(65) Prior Publication Data
US 2011/0278954 A1    Nov. 17, 2011

(30) Foreign Application Priority Data
May 11, 2010 (CN) ............ 2010 1 0182610

(51) Int. Cl.
*H01H 35/00* (2006.01)

(52) U.S. Cl.
USPC .................................................. 307/116

(58) Field of Classification Search
USPC .................. 307/116–131; 340/604
See application file for complete search history.

(56) References Cited

U.S. PATENT DOCUMENTS

| | | | |
|---|---|---|---|
| 8,218,279 B2* | 7/2012 | Liao et al. | 361/93.1 |
| 2007/0075590 A1* | 4/2007 | Chung et al. | 307/116 |
| 2008/0094232 A1* | 4/2008 | Yokote | 340/604 |

FOREIGN PATENT DOCUMENTS

| | | |
|---|---|---|
| CN | 1484162 A | 3/2004 |
| CN | 2667831 Y | 12/2004 |
| CN | 101237140 A | 8/2008 |

* cited by examiner

*Primary Examiner* — Rexford Barnie
*Assistant Examiner* — Rasem Mourad

(57) ABSTRACT

An electronic apparatus for conditionally power supplying is provided. In the electronic apparatus, an external connection port is embedded on a surface of a case for electrically connecting to an external device, and includes plural exposed terminals including one power pin. First and second detection electrodes are disposed on the surface of the case and normally maintain in broken-circuit. When the first and the second detection electrodes are in a wetting condition, the first and the second detection electrodes are in short-circuit. A switch is electrically connected to a power module and the power pin. A control module detects that the first and the second detection electrodes are in short-circuit or in broken-circuit, and drives the switch to make the power module output power to the power pin when the first detection electrode and the second detection electrode are in broken-circuit.

16 Claims, 6 Drawing Sheets

ELECTRONIC APPARATUS AND METHOD FOR CONDITIONALLY POWER SUPPLYING

CROSS-REFERENCES TO RELATED APPLICATIONS

This non-provisional application claims priority under 35 U.S.C. §119(a) on Patent Application No. 201010182610.X filed in China on May 11, 2010, the entire contents of which are hereby incorporated by reference.

BACKGROUND OF THE INVENTION

1. Technical Field

The present invention relates to an electronic apparatus and power management method thereof, and more particularly to an electronic apparatus and a method for conditionally power supplying.

2. Related Art

For an electronic apparatus used underwater, for example, the electronic apparatus conforming to the International Protection Code, has to equipped with a watertight case in which the seams of thereof are treated to make the case watertight. As such, when the electronic apparatus is operated underwater, the watertight case can securely enclose the electronic circuit to prevent water from entering the case. As for the waterproof requirement of buttons of the electronic apparatus, an impermeable film is adhered to the inner surface or the outer surface to cover the button holes of the case, so as to prevent water from entering the interior of the case through the button holes.

Please refer to FIG. 1, regarding to an external connection port 101a of the electronic apparatus, the external connection port 101a cannot be normally encapsulated in a watertight case 101 because it has to be connected with an external device. Generally, when the external connection port 101a is not connected with the external device, a waterproof cover 103a covers on the external connection port 101a. The waterproof cover 103a is combined with the case 101, so as to keep water away from the connecting terminals 105a of the external connection port 101a. As a result, neither short-circuit event nor electrolytic effect will occur to the connecting terminals 105a since they are kept away from water by the waterproof cover 101. Furthermore, the waterproof cover 103a also prevents water from entering the case through the external connection port 101a.

Regarding to some types of the external connection port 101a for special requirement, an external connection port 101a of such types has to be always exposed on the case without the waterproof cover 103a. Although the external connection port 101a of such types waterproof, but the connecting terminals 105a thereof are still exposed to water. Furthermore, the external connection port 101a usually has at least one connecting terminals 105a that maintains a non-zero voltage level. Therefore, when being exposed to water, an electrolysis phenomenon occurs to and corrodes the connecting terminals 105a. And water also cause a short-circuit effect among the connecting terminals 105a and a signal malfunction.

SUMMARY

In view of the aforementioned problems, the present invention is directed to provide an electronic apparatus for conditionally power supplying which can avoid short-circuit, electrical contact corrosion, or system error when an electrical contact is exposed in a wet condition.

The present invention provides an electronic apparatus for conditionally power supplying, which includes a case, an external connection port, a first detection electrode, a second detection electrode, a switch, and a control module. An electronic circuit and a power module are accommodated inside the case, and the power module supplies power to the electronic circuit. The external connection port is embedded on a surface of the case for connecting an external device to the electronic apparatus. The external connection port comprises a plurality of exposed terminals, in which at least one of the exposed terminals is a power pin. The first detection electrode and the second detection electrode are respectively disposed on the surface of the case, and the electronic apparatus supplies power to at least one of the first detection electrode and the second detection electrode. The first detection electrode and the second detection electrode are separated by a gap, and normally maintain in broken-circuit. When being in a wet condition, the first detection electrode and the second detection electrode are in short-circuit. The switch is disposed inside the case, and is electrically connected between the power module and the power pin. The control module is disposed inside the case and electrically connected to the first detection electrode and the second detection electrode, and controls the switch.

The control module is adapted for detecting that the first detection electrode and the second detection electrode are in short-circuit or in broken-circuit. When the first detection electrode and the second detection electrode are in broken-circuit, and the control module drives the switch to connect the power module to the power pin, such that the power module outputs power to the power pin. And, when the first detection electrode and the second detection electrode are in broken-circuit without the external connection port connecting to the external device, the control module drives the switch to disconnect the power module from the power pin, such that the power module stops outputting power to the power pin.

The present invention further provides a method for conditionally power supplying, which is applicable to an electronic apparatus. The electronic apparatus at least comprises a case, an electronic circuit, and an external connection port; the case accommodates the electronic circuit; the external connection port is embedded on the surface of the case. The method comprises the following steps: disposing a first detection electrode and a second detection electrode on the surface of the case, and giving a gap between the first detection electrode 與 second detection electrode; supplying power to at least one of the first detection electrode and the second detection electrode; detecting that the first detection electrode and the second detection electrode are in short-circuit or broken-circuit; when detecting that the first detection electrode and the second detection electrode are in broken-circuit, outputting power to the external connection port; when detecting that the first detection electrode and the second detection electrode are in short-circuit, stopping outputting power to the external connection port; and continuously detecting that the first detection electrode and the second detection electrode are in short-circuit or broken-circuit.

The control module of the present invention continuously detects the wetness condition of the surface of the case through the first detection electrode and the second detection electrode. When the first detection electrode and the second detection electrode are in broken-circuit (for example, the case is not dipped in water), or when the external connection port is electrically connected to the external device, the control module drives the switch to make the power module and the power pin being in short-circuit, so that the power module outputs power to the power pin. The above control mechanism avoids the power pin from continuously maintaining a non-zero voltage level in a wet condition, and thus avoids a short circuit, electrical contact corrosion, or system error when the power pin is in water.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
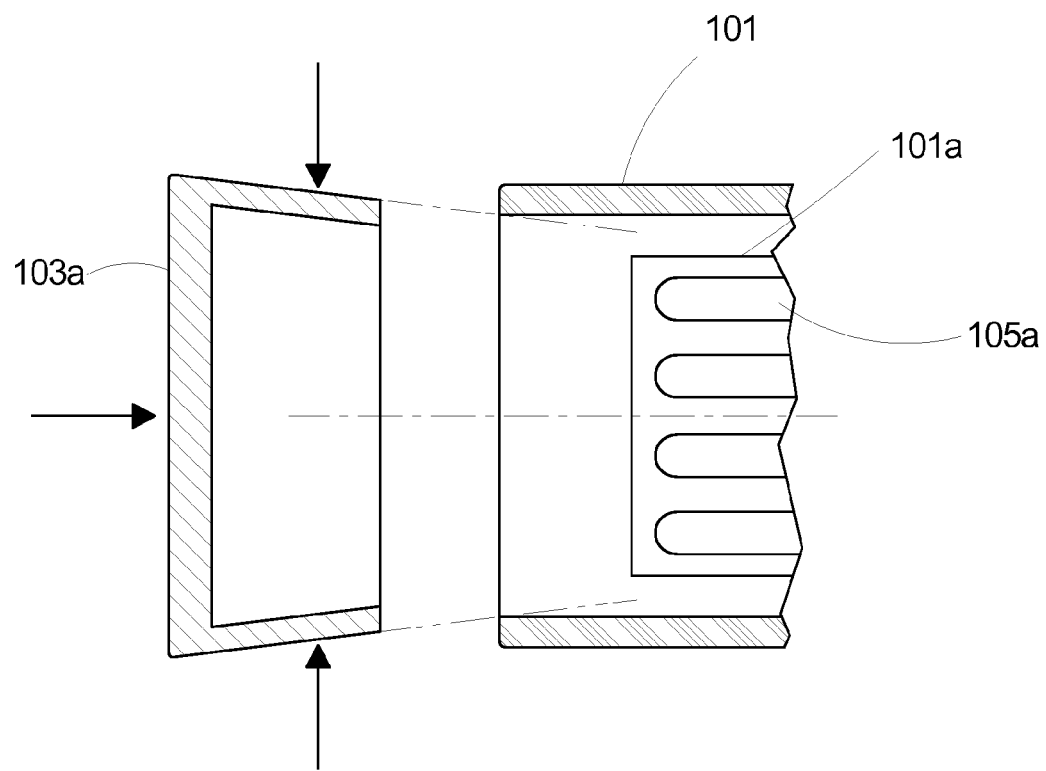
FIG. 1 is a cross-sectional view of an electronic apparatus showing a waterproof cover on an external connection port in the prior art.
Figure 2:
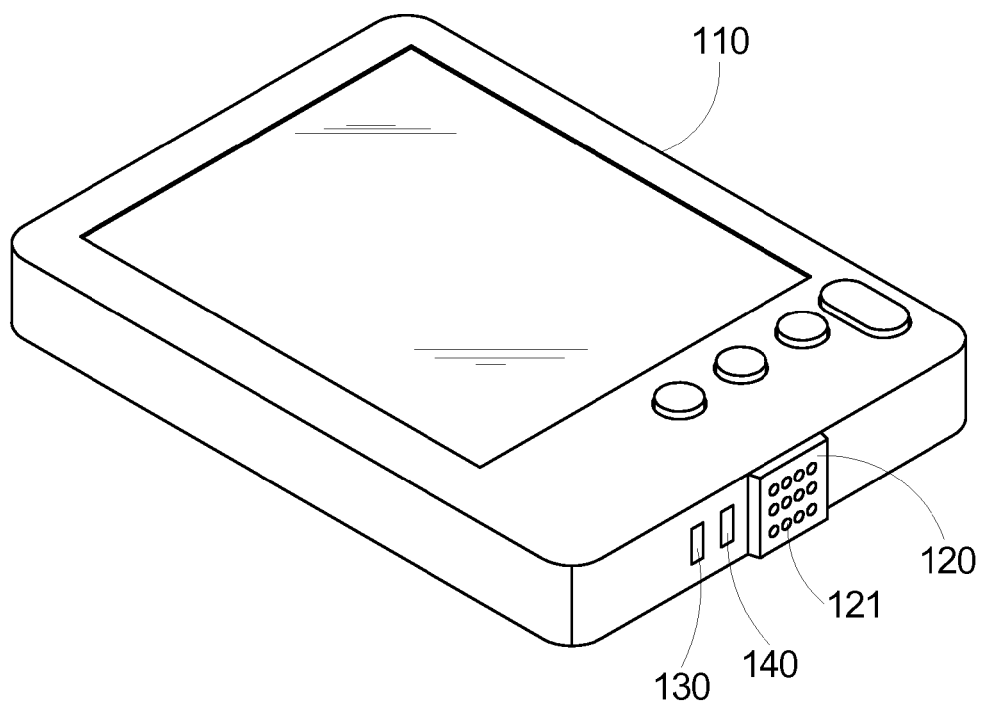
FIG. 2 is a perspective view of an electronic apparatus according to a first embodiment of the present invention.
Figure 3:
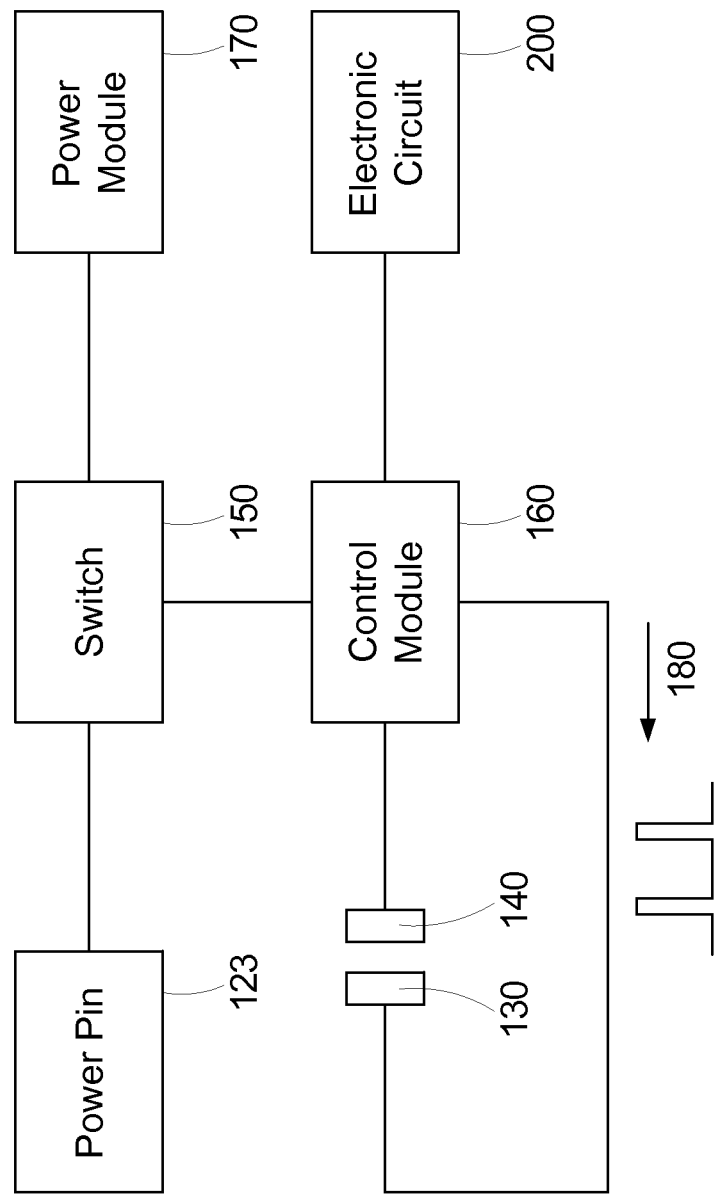
FIG. 3 is a block diagram of the first embodiment of the present invention.

FIG. 2 and FIG. 3 are a perspective view and a block diagram of an electronic apparatus for conditionally power supplying according to a first embodiment of the present invention. The electronic apparatus for conditionally power supplying according to the first embodiment of the present invention comprises a case 110, an external connection port 120, a first detection electrode 130, a second detection electrode 140, a switch 150, and a control module 160. The electronic apparatus can be a portable electronic apparatus, which is usually operated in a wet condition. The examples of the electronic apparatus include a laptop computer, a tablet PC, a mobile phone, a personal digital assistant (PDA), an MP3 player, a global position system (GPS), and other portable electronic apparatuses.

Referring to FIG. 2 and FIG. 3, the case 110 accommodates an electronic circuit 200 and a power module 170 therein. The power module 170 supplies power to the electronic circuit 200. In addition, the power switch 150 and the control module 160 are also disposed inside the case 110.

Please refer to FIG. 2 and FIG. 3, the external connection port 120 is embedded on a surface of the case 110, and is provided for electrically connecting an external device to the electronic apparatus. The external connection port 120 has to be normally exposed on the surface of the case 110. The external connection port 120 comprises a plurality of exposed terminals 121. Each exposed terminal 121 is exposed on the surface of the case 110, and is electrically connected to the electronic circuit 200 or the power module 170.

One or more of the exposed terminals 121 are power pins 123. The external device receives power supplied by the power module 170 via the power pin 123.

Please refer to FIG. 2 and FIG. 3, the first detection electrode 130 and the second detection electrode 140 are respectively disposed on the surface of the case 110, and the electronic apparatus supplies power to at least one of the first detection electrode 130 and the second detection electrode 140. The first detection electrode 130 and the second detection electrode 140 are separated by a gap, which makes the first detection electrode 130 and the second detection electrode 140 normally maintain in broken-circuit. When both the first detection electrode 130 and the second detection electrode 140 are in a wet condition (for example, when the case 110 is dipped in water), the first detection electrode 130 and the second detection electrode 140 are in short-circuit via water between the first detection electrode 130 and the second detection electrode 140.

The switch 150 is disposed inside the case 110, electrically connected between the power module 170 and the power pin 123, and driven to be changed between a first state and a second state. In the first state, the switch 150 disconnects the power module 170 from the power pin 123, and thus the power module 170 stops supplying power to the power pin 123. In the second state, the switch 150 connects the power module 170 to the power pin 123, and thus the power module 170 outputs power to the power pin 123.

The control module 160 is disposed inside the case 110 and electrically connected to the first detection electrode 130 and the second detection electrode 140, and drives the switch 150 to be changed between the first state and the second state. The electronic apparatus supplies power to at least one of the first detection electrode 130 and the second detection electrode 140, so that the control module 160 detects whether the first detection electrode and the second detection electrode are in short-circuit or in broken-circuit, so as to drive the switch 150 to be changed between the first state and the second state.

In a preferred example for the electronic apparatus supplying power to at least one of the first detection electrode 130 and the second detection electrode 140, the power is a test signal 180 that is normally transmitted by the control module 160. The control module 160 normally transmits the test signal 180 to the first detection electrode 130, and determines whether a voltage level of the second detection electrode 140 changes, so as to detect whether the first detection electrode 130 and the second detection electrode 140 are in short-circuit or in broken-circuit.

When the first detection electrode 130 and the second detection electrode 140 are in broken-circuit, the control module 160 drives the switch 150 to the second state, so that the power module 170 outputs power to the power pin 123. When the first detection electrode 130 and the second detection electrode 140 are in short-circuit, firstly, an operating system (OS) determines whether the external connection port 120 is connected with the external device. If it is determined that the external connection port 120 is not electrically connected to the external device, the control module 160 drives the switch 150 to the first state, so as to disconnect the power module 170 from the power pin 123. The test signal 180 can be a pulse signal.

Figure 4:
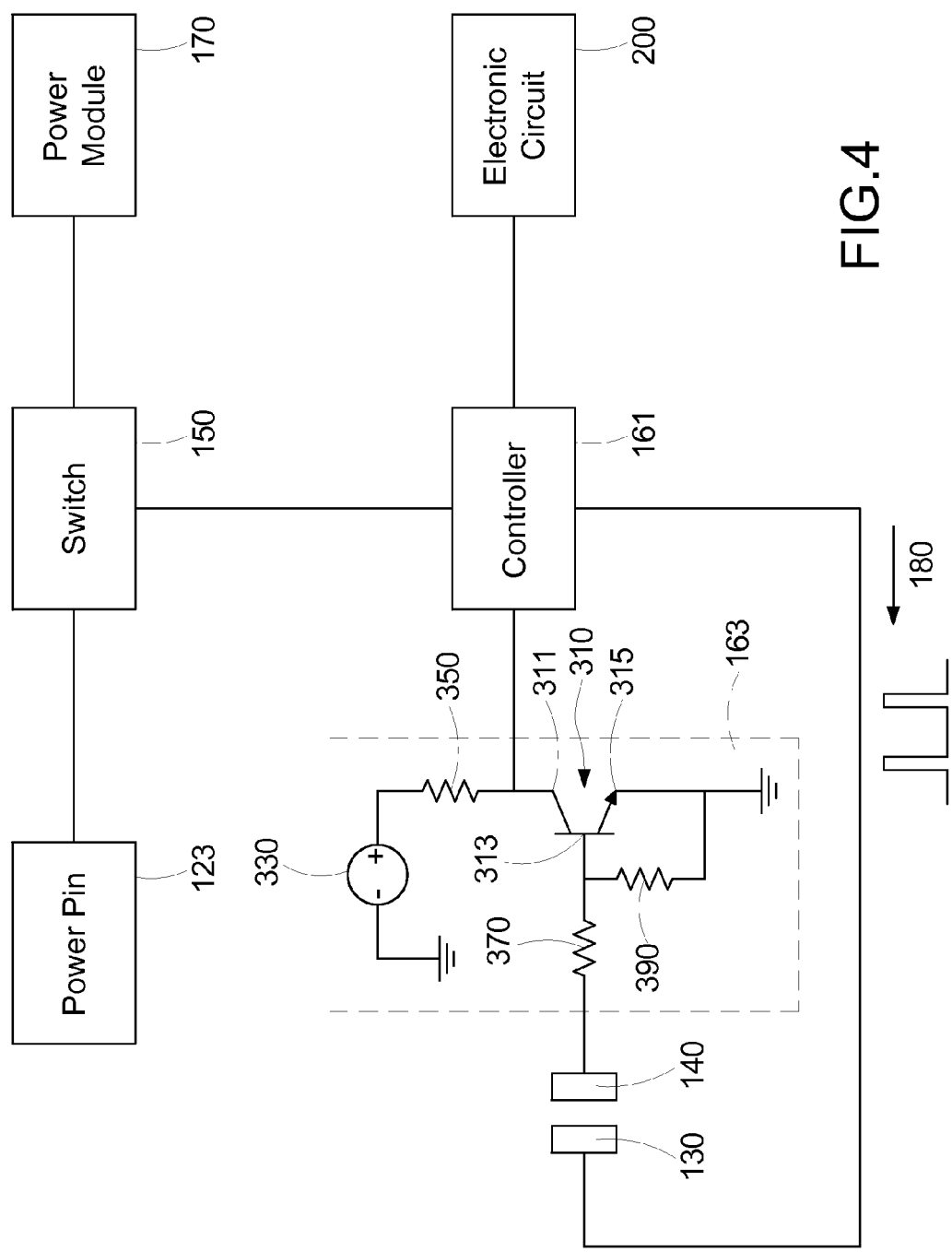
FIG. 4 is a circuit diagram of the first embodiment of the present invention.

FIG. 4 is a circuit diagram of a first embodiment of the present invention. The control module 160 includes a controller 161 and a logic circuit 163.

The controller 161 is electrically connected to the first detection electrode 130, and normally transmits the test signal 180 to the first detection electrode 130. The logic circuit 163 is electrically connected between the controller 161 and the second detection electrode 140. When the first detection electrode 130 and the second detection electrode 140 are in short-circuit, the test signal 180 is transmitted to the controller 161 via the first detection electrode 130, the second detection electrode 140, and the logic circuit 163. The controller 161 can be an embedded controller (EC). The logic circuit 163 can a phase inverting circuit, such as a bipolar junction transistor (BJT) inverter, which is disposed between the EC and the second detection electrode 140.

The logic circuit 163 disclosed in FIG. 4 is a phase inverting circuit composed of an NPN bipolar junction transistor 310 (briefed as a transistor below). A collector 311 of the transistor 310 is electrically connected to an operating voltage source 330 via a first resistor 350, and a base 313 of the transistor 310 is electrically connected to the second detection electrode 140 via a second resistor 370. A third resistor 390 is electrically connected between the base 313 and an emitter 315, and the emitter 315 is electrically connected to the ground.

The controller 161 is electrically connected to the collector 311. When the first detection electrode 130 and the second detection electrode 140 are in broken-circuit, the voltage levels of the second detection electrode 140 and the base 313 are zero. At this time, the transistor 310 is operating in a cutoff region, and the collector 311 and the emitter 315 are in broken-circuit. Therefore, the controller 161 receives a high voltage level signal from the operating voltage source 330 via the first resistor 350, and thus it is determined that the first detection electrode 130 and the second detection electrode 140 are in broken-circuit.

When the first detection electrode 130 and the second detection electrode 140 are in short-circuit, the second detection electrode 140 receives the test signal 180 transmitted by the first detection electrode 130, and make the base 313 have a high voltage level. At this time, the transistor 310 is in short-circuit, and by-passes the operating voltage source 330 to be grounded. As such, the controller 161 receives a low voltage level or zero voltage level signal, and thus it is determined that the first detection electrode 130 and the second detection electrode 140 are in short-circuit.

The controller 161 determines whether the electronic apparatus is in a wet condition according to the high and low voltage level signals received by the logic circuit 163.

When the electronic apparatus leaves the wet condition, the first detection electrode 130 and the second detection electrode 140 are in broken-circuit, and the controller 161 drives the switch 150 to the second state, as such, the power module 170 supplies power to the power pin 123.

Figure 5:
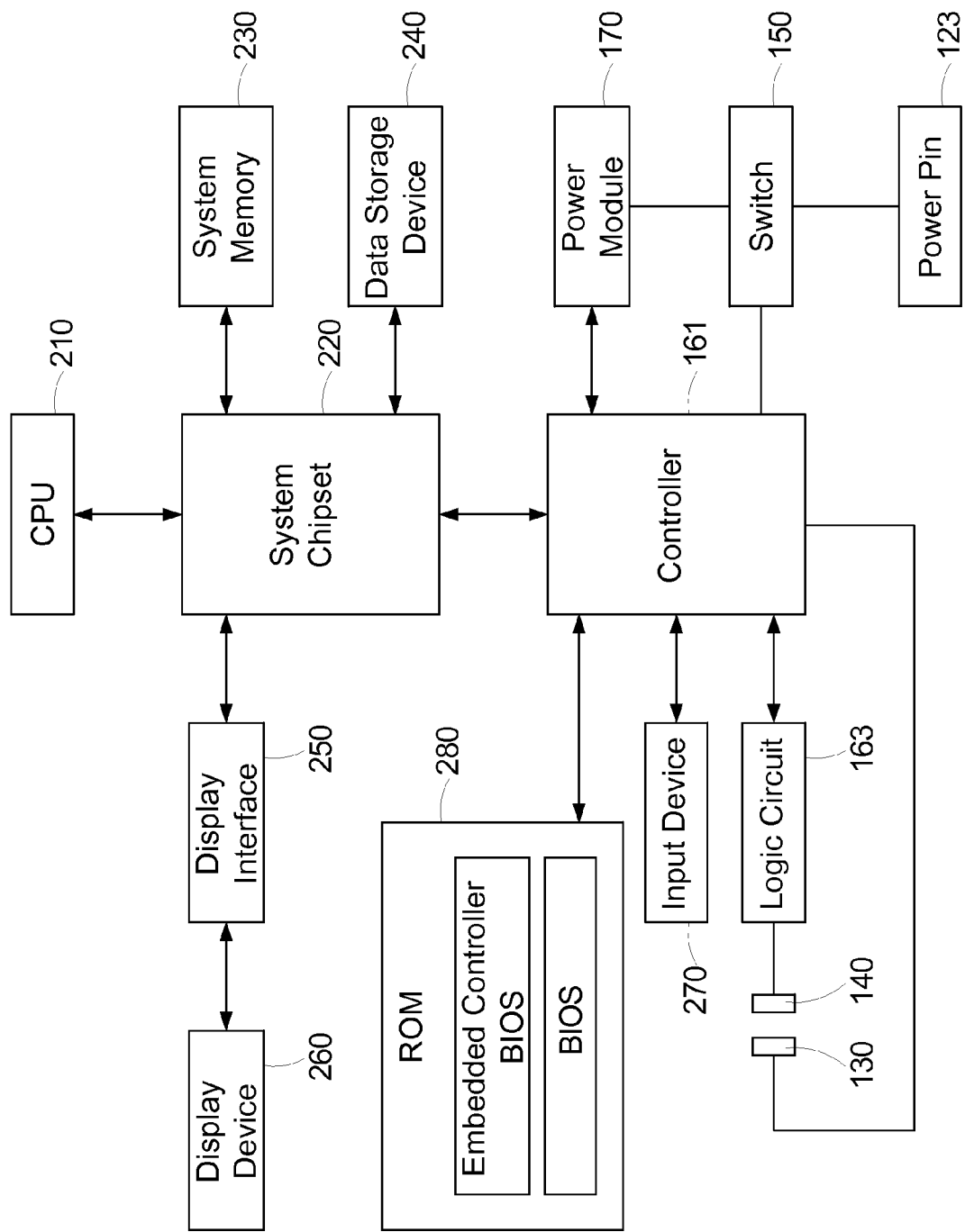
FIG. 5 is a system block diagram of a second embodiment of the present invention.

FIG. 5 is a system block diagram of a second embodiment of the present invention. The second embodiment takes a laptop computer as an example of the electronic apparatus for conditionally power supplying. Basically, the laptop computer includes an electronic circuit, an external connection port (not shown), a first detection electrode 130, a second detection electrode 140, a switch 150, a control module, and a power module 170.

The electronic circuit includes a central processor unit (CPU) 210, a system chipset 220, a system memory 230, a data storage device 240, a display interface 250, a display device 260, an input device 270, and a read only memory (ROM) 280. The system chipset 220 includes a north bridge chip and a south bridge chip, which are respectively provided for connection of different data buses. In this example, the north bridge chip and the south bridge chip are illustrated by being simplified as the system chipset 220. The system memory 230, the data storage device 240, and the display interface 250 are electrically connected to the CPU 210 via buses of the system chipset 220. The display interface 250 generates a display signal to the display device 260. An operating system is installed in the data storage device 240, so that the CPU 210 loads the operating system from the data storage device 240 to the system memory 230 and executes the operating system. The power module 170 supplies power to the electronic circuit, and the power is required for the operation of the operation of the electronic circuit.

The control module includes a controller 161 and a logic circuit 163. In the second embodiment, the controller 161 is an embedded controller (EC) or a keyboard controller (KBC) on practice, which is electrically connected to the CPU 210 via the system chipset 220. Through setting of the firmware, the controller 161 is additionally quipped with functions of detecting whether the first detection electrode 130 and the second detection electrode 140 are in short-circuit and driving the switch 150. The controller 161 is electrically connected to the system chipset 220, the input device 270, the ROM 280, and the power module 170. When the electronic apparatus is activated, the controller 161 initializes the peripheral equipment. The CPU 210 loads and executes a basic input output system (BIOS) and an embedded controller BIOS in the ROM 280 via the system chipset 220 and the controller 161, and start to load and execute the operating system, a driving program, and an application program in the data storage device 240, so as to start the electronic apparatus to operate.

This embodiment is used to illustrate how the present invention is combined with the circuit architecture of the laptop computer, in which elements and the operation modes are the same with those in the first embodiment.

Figure 6:
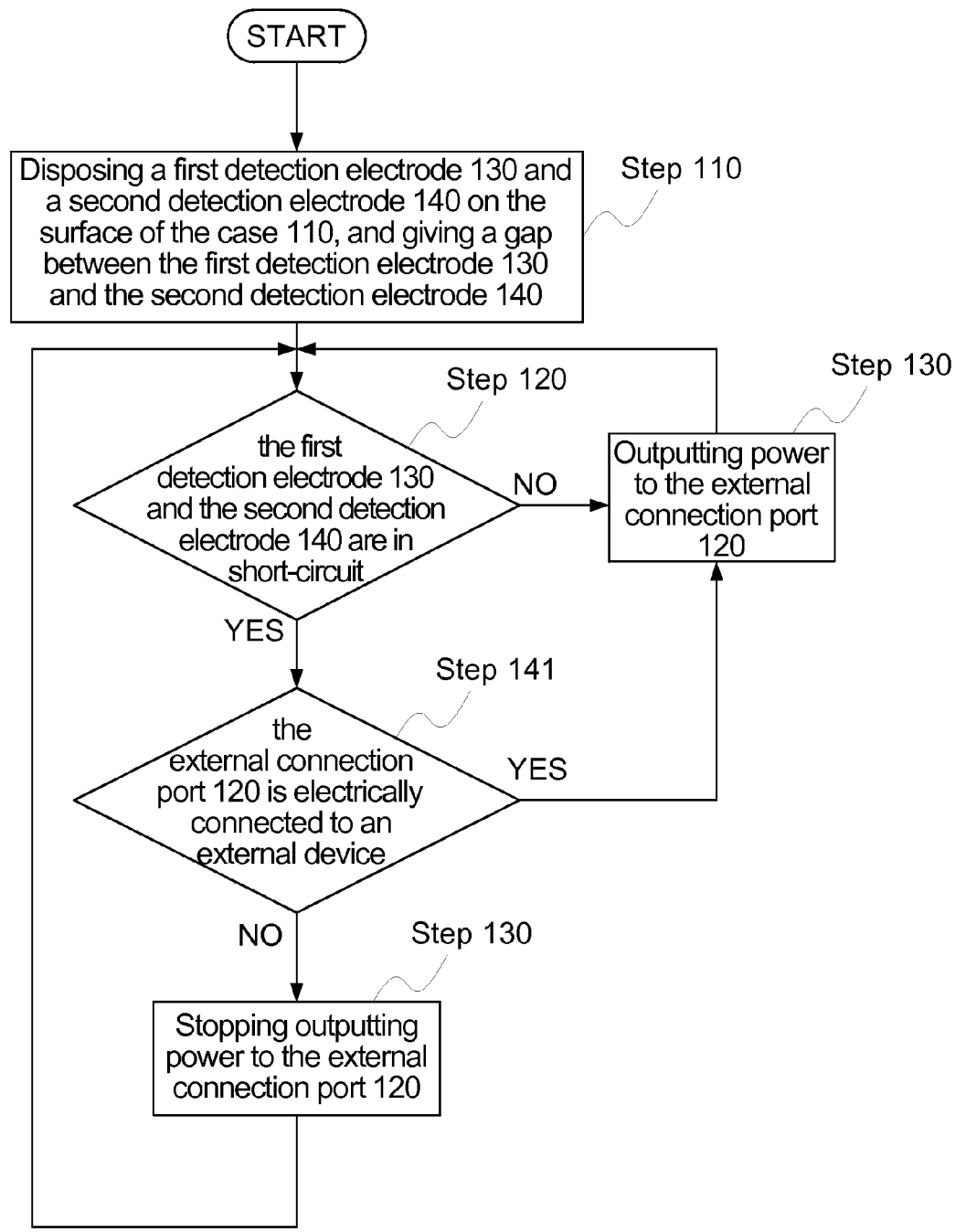
FIG. 6 is a flowchart of a method for conditionally power supplying of the present invention.

Please refer to FIG. 6, a method for conditionally power supplying is provided and applicable to an electronic apparatus. The electronic apparatus 100 of the first embodiment is taken as an illustration hereinafter. The electronic apparatus 100 comprises a case 110, an electronic circuit 200, an external connection port 120, a switch 150, a control module 160, and a power module 170. The case 110 accommodates the electronic circuit 200, the switch 150, the control module 160, and the power module 170. The external connection port 120 is embedded on a surface of the case and connected to the electronic circuit 200 or the power module 170.

Please refer to FIG. 6, the first step of the method is to dispose a first detection electrode 130 and a second detection electrode 140 on the surface of the case 110 and give a gap between a first detection electrode 130 and a second detection electrode 140, so as to keep the first detection electrode 130 and the second detection electrode 140 to be in broken-circuit normally, as in Step 110.

And then the control module 160 supplies power to at least one of the first detection electrode 130 and the second detection electrode 140, and continuously detects that the first detection electrode and the second detection electrode are in short-circuit or in broken-circuit, as in Step 120. The power is a test signal 180. The control module 160 normally transmits the test signal 180 to one of the first detection electrode 130 and the second detection electrode 140, and determines whether a voltage level of another one changes, so as to detect whether the first detection electrode 130 and the second detection electrode 140 are in short-circuit or in broken-circuit.

When the control module 160 detects that the first detection electrode 130 and the second detection electrode 140 are in broken-circuit, the control module 160 drives the switch 150 to connect the power module 170 to the external connection port 120, so as to output power to the external connection port 120, as in Step 130.

After outputting power to the external connection port 120, the step performed by the control module 160 returns to Step 120, that is, the control module 160 continuously detects that the first detection electrode 130 and second detection electrode 140 are in short-circuit or in broken-circuit.

When the control module 160 detects that the first detection electrode 130 and the second detection electrode 140 are in short-circuit, the control module 160 drives the switch 150 to stop outputting power to the external connection port 120, as in Step 140. After outputting power to the external connection port 120, the step performed by the control module 160 returns to Step 120, so as to continuously detecting whether the first detection electrode 130 and the second detection electrode 140 are in short-circuit.

To preventing an external device from being accidentally disconnected from the electronic apparatus 100, before performing Step 140, that is when determining that the first detection electrode 130 and the second detection electrode 140 are in short-circuit, the control module 160 determines whether the external connection port 120 is electrically connected to an external device through executing an operating system, as in Step 141.

If the external connection port 120 is not electrically connected to the external device, the control module 160 drives the switch 150 to make the power module 170 stop outputting power to the external connection port 120, as in Step 140.

If the external connection port 120 is electrically connected to the external device, the control module 160 drives the switch 150 to make the power module 170 keep on outputting power to the external connection port 120, as in Step 130, and then the performed step returns to Step 120.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An electronic apparatus for conditionally power supplying, comprising:
  a case, accommodating an electronic circuit and a power module therein, and the power module supplying power to the electronic circuit;
  an external connection port, embedded on a surface of the case for connecting an external device to the electronic apparatus, and comprising a plurality of exposed terminals exposed on the surface, in which one of the exposed terminals is a power pin;
  a first detection electrode and a second detection electrode, respectively disposed on the surface of the case, wherein the electronic apparatus is arranged such that power is supplied to at least one of the first detection electrode and the second detection electrode, the first detection electrode and the second detection electrode are separated by a gap and normally maintain in broken-circuit, and the first detection electrode and the second detection electrode are in short-circuit when being in a wet condition;
  a switch, disposed inside the case, and electrically connected between the power module and the power pin; and
  a control module, disposed inside the case, electrically connected to the first detection electrode and the second detection electrode, and for driving the switch, wherein the electronic apparatus is arranged such that the control module detects that the first detection electrode and the second detection electrode are in short-circuit or in broken-circuit, and drives the switch to make the power module output power to the power pin when the first detection electrode and the second detection electrode are in broken-circuit.

2. The electronic apparatus as claimed in claim 1, wherein the control module drives the switch to make the power module and the power pin being in broken-circuit when the first detection electrode and the second detection electrode are in short-circuit without the external connection port being electrically connected to the external device.

3. The electronic apparatus as claimed in claim 1, wherein the power supplied by the electronic apparatus to at least one of the first detection electrode and the second detection electrode is a test signal, and the test signal is normally transmitted by the control module to the first detection electrode.

4. The electronic apparatus as claimed in claim 3, wherein the test signal is a pulse signal.

5. The electronic apparatus as claimed in claim 3, wherein the control module comprises:
  a controller, electrically connected to the first detection electrode, and normally transmitting the test signal to the first detection electrode; and
  a logic circuit, electrically connected between the controller and the second detection electrode, for transmitting the test signal to the controller through the first detection electrode, the second detection electrode, and the logic circuit when the first detection electrode and the second detection electrode are in short-circuit.

6. The electronic apparatus as claimed in claim 5, wherein the controller is an embedded controller (EC).

7. The electronic apparatus as claimed in claim 5, wherein the logic circuit is a phase inverting circuit, disposed between the EC and the second detection electrode.

8. The electronic apparatus as claimed in claim 7, wherein the phase inverting circuit is a bipolar junction transistor (BJT) inverter.

9. An electronic apparatus for conditionally power supplying, comprising:
  an electronic circuit, comprising a central processor unit (CPU), a system chipset, a system memory, a data storage device, a display interface, a display device, an input device, and a read only memory (ROM), in which the system memory, the data storage device, and the display interface are electrically connected to the CPU through the system chipset, and the display interface generates a display signal to the display device;
  a power module, supplying power to the electronic circuit;
  an external connection port, embedded on a surface of the electronic apparatus, provided for an external device to communicated with the electronic apparatus, and comprising a plurality of exposed terminals, in which at least one of the exposed terminals is a power pin;
  a first detection electrode and a second detection electrode, respectively disposed on the surface of the electronic apparatus, and the electronic apparatus supplying power to at least one of the first detection electrode and the second detection electrode, wherein the electronic apparatus is arranged such that the first detection electrode and the second detection electrode are separated by a gap and normally maintain in broken-circuit, and the first detection electrode and the second detection electrode are in short-circuit when being in a wet condition;
  a switch, electrically connected between the power module and the power pin; and
  a control module, disposed inside the electronic apparatus, electrically connected to the first detection electrode and the second detection electrode, and for driving the switch, wherein the electronic apparatus is arranged such that the control module detects that the first detection electrode and the second detection electrode are in short-circuit or in broken-circuit, and drives the switch to make the power module output power to the power pin when the first detection electrode and the second detection electrode are in broken-circuit.

10. The electronic apparatus as claimed in claim 9, wherein:
- an operating system is installed in the data storage device, and the CPU loads the operating system to the system memory and executes the operating system; and
- when the first detection electrode and the second detection electrode are in short-circuit, and an operating system operated by the electronic apparatus determines that the external connection port is not electrically connected to the external device, the control module drives the switch to make the power module and the power pin being in broken-circuit.

11. The electronic apparatus as claimed in claim 10, wherein the power supplied by the electronic apparatus to at least one of the first detection electrode and the second detection electrode is a test signal, and the test signal is normally transmitted by the control module to the first detection electrode.

12. The electronic apparatus as claimed in claim 10, wherein the test signal is a pulse signal.

13. The electronic apparatus as claimed in claim 11, wherein the control module comprises:
- a controller, electrically connected to the system chipset, and normally transmitting the test signal to the first detection electrode; and
- a logic circuit, electrically connected between the controller and the second detection electrode, for transmitting the test signal to the controller through the first detection electrode, the second detection electrode, and the logic circuit when the first detection electrode and the second detection electrode are in short-circuit.

14. The electronic apparatus as claimed in claim 9, wherein the controller is an embedded controller (EC) or a keyboard controller (KBC).

15. An method for conditionally power supplying, applicable to an electronic apparatus, in which the electronic apparatus at least comprises a case, an electronic circuit, and an external connection port, the case accommodates the electronic circuit, and the external connection port is embedded on a surface of the case, the method comprising the following steps:
- disposing a first detection electrode and a second detection electrode on the surface of the case, and giving a gap between the first detection electrode and the second detection electrode;
- supplying power to at least one of the first detection electrode and the second detection electrode;
- detecting that the first detection electrode and the second detection electrode are in short-circuit or in broken-circuit;
- when the first detection electrode and the second detection electrode are in broken-circuit, outputting power to the external connection port; or when the first detection electrode and the second detection electrode are in short-circuit, stopping outputting power to the external connection port; and
- detecting that the first detection electrode and the second detection electrode are in short-circuit or in broken-circuit.

16. The method as claimed in claim 15, further comprising the following steps when detecting that the first detection electrode and the second detection electrode are in short-circuit:
- determining whether the external connection port is electrically connected to an external device;
- stopping outputting power to the external connection port if the external connection port is not electrically connected to the external device; or outputting power to the external connection port if the external connection port is electrically connected to the external device.

* * * * *